Sept. 16, 1941.  R. C. HOYT  2,255,974
FLUID OPERATED BRAKE
Filed Sept. 20, 1935
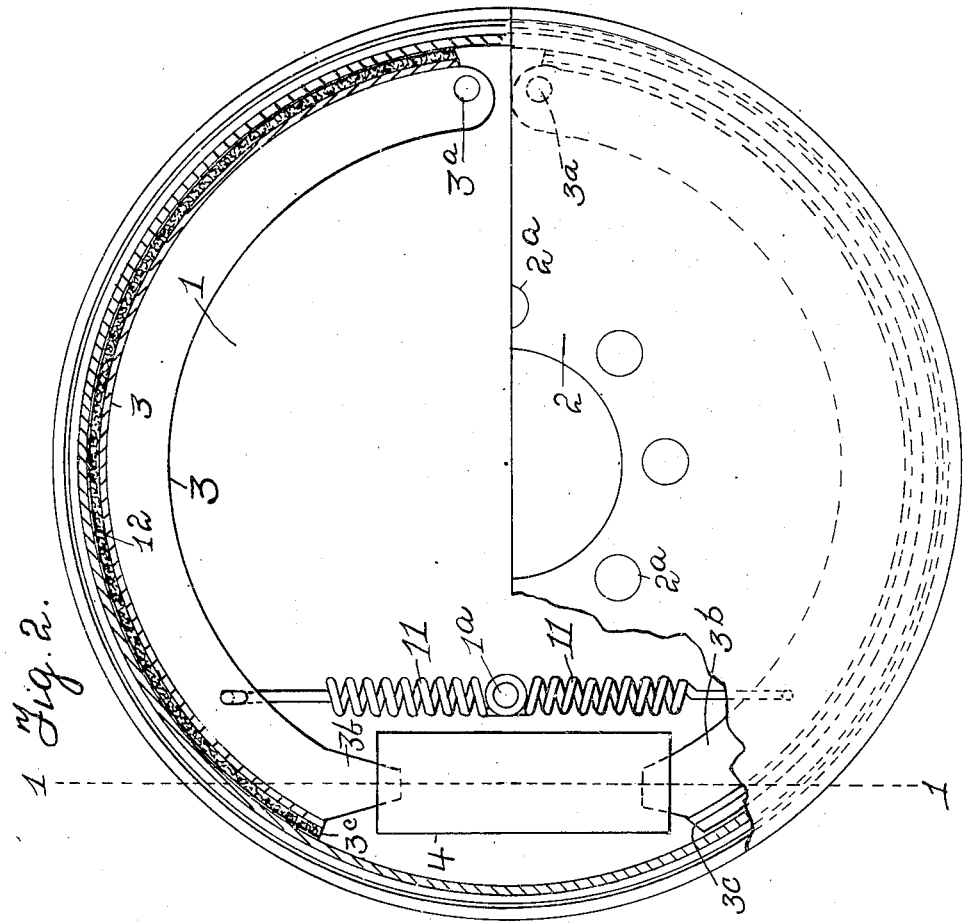
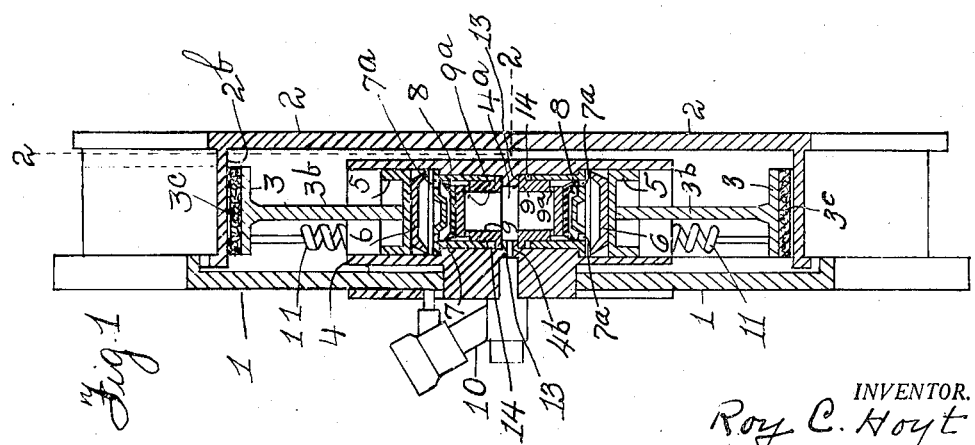
INVENTOR.
Roy C. Hoyt
BY James T. Watson
ATTORNEYS.

Patented Sept. 16, 1941

2,255,974

UNITED STATES PATENT OFFICE 2,255,974

FLUID OPERATED BRAKE

Roy C. Hoyt, Duluth, Minn.

Application September 20, 1935, Serial No. 41,391

7 Claims. (Cl. 188—152)

My invention relates to fluid operated brake, for automobiles and for such other vehicles and mechanisms as it may be adapted to serve. It has for an object the provision of fluid-operated braking means in which the fluid is adapted to automatically compensate for wear of the brake shoe lining. With this and other objects in view, it consists of the structures, combinations and arrangements of parts hereinafter described and claimed.

In the drawing, Fig. 1 is a section of my invention on the line 1—1 of Fig. 2. Fig. 2 is a view of my said invention with some parts shown in side elevation and some parts sectioned on the line 2—2 of Fig. 1.

In the drawing, 1 is a relatively stationary or non-rotatable back plate concentric with a vehicle wheel (not shown), and 2 is a brake drum also concentric with such wheel and secured thereto in any suitable manner, as by bolts (not shown), projected through bolt holes 2ª in said drum and through any suitable part of such wheel. Between said drum and back plate and pivotally connected at their heels to said back plate, is a pair of segmental brake shoes 3, each of which extends in an arc approximately concentric with the said drum. The pivots 3ª of said shoes are, preferably, a trifle eccentric, whereby said heels are thrust backward when said shoes are forced outwardly as hereinafter described.

The free ends or toes 3ᵇ of said shoes bear upon the outward face of shoe operating outer pistons 5, which extend into opposite outer end portions of a cylinder 4, which, cylinder, is secured in any suitable manner or by any suitable means to said back plate. Working against the closed inner ends of the shoe operating pistons 5 are inwardly flanged sealing cups 6, inward of each of which sealing cups 6 is positioned in said cylinder a press fit stationary sleeve 7. Working within each stationary sleeve 7 is an outwardly flanged sealing cup 8. These sealing cups 8 serve as check valves, and each thereof cooperates and moves with one of a pair of piston-like valve bodies 9. The sealing cups 8 seat against the closed outer ends of their respective cooperating valve bodies 9, which valve bodies 9 are free to move axially between limits established by engagement of their flanged inner ends with cooperating axially spaced stop shoulders 13 and 14, and hence may be termed floating valve bodies. The space in the central portion of cylinder between the floating valve bodies 9 serves as an intake chamber 4ª for receiving operating fluid conducted to it from any suitable source by any suitable means, as by port 4ᵇ and pipe 10.

Said sealing cups 6 are adapted to be forced closely against the walls of said cylinder by fluid pressure inwardly thereof, but are reciprocable within said cylinder, being adapted to be moved outwardly by fluid pressure from below and to thus push outwardly the shoe operating pistons 5 and the toes of the brake shoes resting upon them, and being adapted to be moved inwardly by the pressure of said pistons 5 and shoes 3 under compression by the hereinafter described springs 11 when the pressure from below is reduced.

Said valve bodies 9 have ports 9ª formed therein for the passage of fluid from the intake chamber 4ª under conditions hereinafter described.

The fixed sleeve 7 is provided in its head with ports 7ª for the passage of fluid in either direction.

The check valve-acting sealing cups 8 are adapted to contract sufficiently to permit leakage, around their peripheries, of fluid from the intake chamber 4ª, but to expand sufficiently to prevent return of such fluid, when the pressure in the intake chamber is reduced. They, also, are reciprocable within said cylinder, being adapted to be moved outwardly by the valve bodies 9 and inwardly by fluid under spring pressure outwardly thereof when the pressure in the intake chamber is reduced.

The means for applying the operating pressure to the fluid in the cylinder may be a foot-actuated piston (not shown, but well known to the art), forced against the fluid in said pipe,—the pressure being released by withdrawal of the operator's foot. Means for applying retracting pressure to the reciprocable parts and fluid in said cylinder comprises contracting springs 11 each secured at one end to any suitable anchorage, as to a pin 1ª on said back plate, and at its opposite end to one of said shoes to retract the toe ends of said shoes, which—by reason of their bearing upon the pistons 5—force back their cooperating reciprocable parts and fluid in said cylinder inwardly thereof.

Upon each of said shoes is preferably secured a lining 3ᶜ (of any suitable material) adapted to contact with the inner face of a flange 2ᵇ, forming part of said drum, when said shoes are moved to operative position, in opposition to said springs 11, by fluid pressure inwardly of the pistons, respectively.

It will be observed that a quantity of fluid is normally trapped between the sealing cups 6 and 8. As the lining of the shoes becomes worn, more trapped fluid is necessary to force the shoes and linings into operative position, such trapped fluid constituting, in effect reciprocable and increasible non-compressible, filler columns between said sealing cups. The necessary additional fluid will pass out, under pressure, through the ports 9a and leak past the peripheries of the valve-acting sealing cups 8 into the trap-space and passages between said sealing cups 6 and 8 until such space is full when said shoe is in operative position. Thus the wear of the brake-shoe lining will be compensated by the gradual increase of fluid-filler between said gaskets.

In the drawing the several reciprocable parts of the double brake mechanism heretofore described are shown in their normal inoperative retracted positions, where they are automatically moved and retained in the absence of brake setting pressure in the intake chamber 4a by the retracting springs 11. It is important to note that in this inoperative retracted position of the several parts the floating valve bodies 9 are in their inner extreme positioned with their flanges seated against the stop shoulders 13, said valve bodies being maintained, under this condition, in their inner extreme positions by the columns of fluid compressed between their respective check valve-acting sealing cups 8 and their cooperating brake shoe operating sealing cups 6 under the action of the springs 11.

When it is desired to set the brake, additional fluid will be forced into the cylinder intake chamber 4a through the pipe 10 and port 4b, and this additional fluid in the intake chamber and the resultant increase of pressure in the intake chamber will initially produce a substantially simultaneous outward movement of all of the reciprocable parts inclusive of the floating valve bodies 9, sealing cups 6 and 8, actuating pistons 5 and the brake shoes. Outward movement of the floating valve bodies 9 with the expanding column of fluid is the result of the relatively great resistance to passage of fluid through the small ports 9a therein and around the peripheries of the head portions thereof. Outward movement of the floating valve bodies 9 with the column of the fluid is, of course, limited by engagement of the flanges thereof with their respective cooperating stop shoulders 14 at which time it is important to note that the valve-acting sealing cups 8 thereof engage and are stopped against further outward movement by the inpressed axial portions of the heads of the press fit stationary sleeve 7. If, when the floating valve bodies 9 and their respective cooperating valve-acting sealing cups 8 have reached their outer extreme positions the brake shoe linings have not yet come into full braking engagement with the brake drum, continued brake setting pressure in the intake chamber 4a will cause fluid from said chamber 4a to seep through the small ports 9a in the floating valve bodies 9 and past the valve-acting sealing cups 8 in an outward direction, thereby increasing the length of the columns of fluid between the sealing cups 8 and their respective cooperating piston sealing cups 6 until the brake shoe linings have become fully set against the brake drum. It will, of course, be understood that the amount of fluid which will flow past the floating valve bodies 9 under each brake setting operation will be only such a limited and almost infinitesimal quantity as will be required to lengthen the fluid column between the sealing cups 6 and 8 sufficiently to compensate for the very slight wear produced by the preceding braking period. In the drawing there is a very decided clearance shown between the heads of the sealing cups and the interior of the stationary sleeves 7 in order to make the following of the fluid path easy, but in practice just normal working clearances are sufficient, due to the exceedingly small and almost infinitesimal amount of fluid passed by the floating valve bodies during any one braking operation.

When the fluid pressure in the intake chamber 4a is relieved to release the brake, the several reciprocating parts inclusive of the free or toe end portions of the brake shoes, the actuating pistons and their sealing cups 6 and the floating valve pistons 9 and their respective cooperating sealing cups 8 and the quantity of fluid entrapped between cooperating sealing cups 6 and 8 move inwardly under the retracting pressure of springs 11 to the extent permitted by an engagement of the flanges of the valve bodies 9 with the stop shoulders 13 at which time the said several reciprocating parts come to and remain at rest, further movement of the actuating pistons 5 and their sealing cups 6 and the entrapped columns of fluid being prevented by the valve-acting sealing cups 8 which permit flow of fluid in an outward direction, but positively prevent flow of the fluid therepast in an inward direction. Hence, it will be seen that the free or toe end portions of the linings or facings 3c of the brake shoes are always retracted to, at the end of a braking period and remain between brake setting periods in, positions a definite distance from the drum so that, regardless of the stage of wear of the brake shoe facings and engaged surfaces of the brake drum, which constitute together the friction surfaces of the brake. The said toe end portions of the brake shoe facings will always be positioned between braking operations in exactly the desired spaced relation to the drum, and this of course without requiring any manual adjustment whatsoever. It will be seen that between braking operations the springs 11 acting through the brake shoes and their cooperating pistons 5 will maintain the columns of fluid entrapped between the cooperating sealing cups 6 and 8 under sufficiently greater pressure than is then existing in the intake chamber 4a to maintain the flanges of the sealing cups 6 and 8 in positive sealing engagement with their cooperating cylindrical surfaces. The valve bodies 9 and their cooperating sealing cups 8 serve as fluid release measuring valves.

What I claim and desire to secure by Letters Patent is—

1. A cylinder for hydraulic brakes having a medial wall and a chamber on each side of said wall, a perforated cup member positioned on each side of said wall, a flexible valve in each cup member, a piston seal in each chamber and a piston operable by said piston seal.

2. A brake having friction elements comprising a brake drum and a brake shoe movable toward and from said drum, actuating means to move the shoe into engagement with the drum, limiting means to maintain a constant clearance between shoe and drum, said shoe actuating means comprising an independent actuating piston mounted in a cylinder and provided with a fluid seal, said limiting means consisting of a floating piston having an instrumentality for limiting its movements, said floating piston being independent of and aligned with said actuating piston and mounted in the same cylinder with the latter said floating piston being provided with a combination fluid seal and fluid check valve for facilitating the trapping of fluid between the two pistons, thereby defining and maintaining the pistons adjusted at a distance corresponding to a desired clearance between the friction elements, while said actuating piston is inactive, and means for normally keeping the trapped fluid between the pistons under pressure so as to urge the fluid seals of both pistons into sealing contact with their common cylinder wall.

3. A brake having friction elements comprising a brake drum and a brake shoe movable toward and from said drum, fluid actuated means for moving the shoe into engagement with the drum, limiting means to restrain the movement of the shoe away from the drum to maintain a constant clearance between said shoe and said drum when said fluid actuated means is inactive, said shoe moving and said limiting means including two independent hydraulic pistons, individually operative and aligned in a common cylinder, both pistons having fluid sealing gaskets arranged so as to facilitate the trapping of fluid between the pistons, the gasket of the piston of said limiting means serving as a one-way fluid check valve, operable towards the space confined between the pistons and preventing the escape of fluid trapped therein, and piston movement limiting means provided at the end of the piston remote from the space confined between the two pistons, for limiting its intended movement in either direction, tension means associated with the brake shoe and adapted to normally keep the fluid trapped between the pistons under pressure.

4. In a fluid brake system comprising a drum, friction means co-operative with said drum, actuating means located in said drum and fluid pressure adjusting means for adjusting the friction means to compensate for wear, said actuating means and said adjusting means comprising a pair of independent, bodily separated pistons, aligned with one another and cooperative in a common cylinder and said adjusting means comprising an annular piston seal cooperative with the bore of said cylinder and arranged to by-pass fluid in one direction.

5. A fluid operated braking system comprising a brake drum, a pair of brake shoes, a pull back spring for said shoes and an operating wheel cylinder, all positioned within said drum, said wheel cylinder containing two aligned brake shoe actuating units each comprising a floating piston in operative engagement with one of said shoes and a second floating piston coaxial with the first mentioned piston and having means for limiting its stroke in each direction, said second floating piston having an annular piston seal arranged to pass fluid to the first piston when the brake is applied and to otherwise retain fluid between both pistons under pressure responsive to said pull back spring.

6. A fluid operated braking system having a master piston to provide fluid pressure and a brake actuating piston responsive to said fluid pressure, and comprising a floating piston having a limited stroke and interposed between the master piston and the brake-actuating piston, said floating piston having two-way limiting means for both directions of axial travel positioned on a side away from said brake actuating piston, and an annular seal whereby fluid passes to said actuating piston to effect an automatic brake adjustment when the brake is applied, and is otherwise retained between said brake actuating piston and said floating piston to maintain said brake adjustment.

7. A brake having friction elements comprising a brake shoe cooperative with a brake drum, a pull back spring for said brake shoe, and a hydraulic cylinder for said brake, said cylinder having a brake actuating unit comprising a floating piston in operative engagement with said shoe and a second floating piston coaxial with said first mentioned piston and having two-way means for limiting its stroke in each of two axial directions, and limiting means being positioned on a side away from said first mentioned piston, said second floating piston having an annular seal arranged to pass fluid to the first piston for effecting an automatic adjustment of said shoe when the brake is applied, and to otherwise retain fluid between said pistons under pressure responsive to said pull back spring for maintaining said adjustment.

ROY C. HOYT.